United States Patent
Holmes

(10) Patent No.: US 9,724,955 B2
(45) Date of Patent: Aug. 8, 2017

(54) SECURITY DEVICES AND METHODS OF MANUFACTURE THEREOF

(71) Applicant: DE LA RUE INTERNATIONAL LIMITED, Hampshire (GB)

(72) Inventor: Brian Holmes, Hampshire (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 35 days.

(21) Appl. No.: 14/762,116

(22) PCT Filed: Feb. 3, 2014

(86) PCT No.: PCT/GB2014/050283
§ 371 (c)(1),
(2) Date: Jul. 20, 2015

(87) PCT Pub. No.: WO2014/118568
PCT Pub. Date: Aug. 7, 2014

(65) Prior Publication Data
US 2015/0352886 A1 Dec. 10, 2015

(30) Foreign Application Priority Data
Feb. 1, 2013 (GB) .................................. 1301788.4

(51) Int. Cl.
*B42D 25/328* (2014.01)
*B42D 25/324* (2014.01)
(Continued)

(52) U.S. Cl.
CPC ........... *B42D 25/324* (2014.10); *B42D 25/00* (2014.10); *B42D 25/29* (2014.10); *B42D 25/328* (2014.10);
(Continued)

(58) Field of Classification Search
CPC ...... B42D 25/00; B42D 25/29; B42D 25/324; B42D 25/328; G03H 1/00; G03H 1/0005; G03H 1/0011; G02B 5/1861
(Continued)

(56) References Cited

U.S. PATENT DOCUMENTS

| 4,728,377 A | 3/1988 | Gallagher |
| 5,538,753 A | 7/1996 | Antes et al. |

(Continued)

FOREIGN PATENT DOCUMENTS

| CA | 2163528 C | 12/1998 |
| CA | 2611195 A1 | 12/2006 |

(Continued)

OTHER PUBLICATIONS

Jun. 11, 2014 International Search Report issued in International Patent Application No. PCT/GB2014/050283.
(Continued)

*Primary Examiner* — William R Alexander
(74) *Attorney, Agent, or Firm* — Oliff PLC

(57) ABSTRACT

A security device is provided, including a first transparent layer having an optically variable effect generating relief structure formed in a surface thereof; a reflection enhancing layer extending over the relief structure and following the contour of the relief; and a second transparent layer extending over the reflection enhancing layer, the lateral extent of the second transparent layer being less than the whole area of the security device and corresponding to the lateral extent of the reflection enhancing layer. The first and/or second transparent layer includes one or more optically effective substances such that the appearance of the optically variable effect generated by the relief structure is different when viewed through the first transparent layer compared with when viewed through the second transparent layer, at least (Continued)

under illumination at a wavelength at which at least one of the optically effective substance(s) is visible.

35 Claims, 10 Drawing Sheets

(51) Int. Cl.
    *G02B 5/18* (2006.01)
    *G03H 1/00* (2006.01)
    *G03H 1/02* (2006.01)
    *B42D 25/29* (2014.01)
    *B42D 25/00* (2014.01)
    *B41M 3/14* (2006.01)

(52) U.S. Cl.
    CPC ......... *G02B 5/1861* (2013.01); *G03H 1/0011* (2013.01); *G03H 1/0244* (2013.01); *B41M 3/14* (2013.01)

(58) Field of Classification Search
    USPC .......................................................... 359/1, 2
    See application file for complete search history.

(56) References Cited

U.S. PATENT DOCUMENTS

| | | | |
|---|---|---|---|
| 5,714,213 | A | 2/1998 | Antes et al. |
| 7,054,042 | B2 * | 5/2006 | Holmes ................ B42D 25/328 359/2 |
| 2004/0101676 | A1 * | 5/2004 | Phillips .................. B32B 27/36 428/323 |
| 2005/0104364 | A1 | 5/2005 | Keller et al. |
| 2007/0020530 | A1 * | 1/2007 | Zientek ................. B42D 25/00 430/1 |
| 2007/0114787 | A1 | 5/2007 | Heim |
| 2009/0317595 | A1 | 12/2009 | Brehm et al. |
| 2010/0045024 | A1 | 2/2010 | Attner et al. |
| 2010/0045027 | A1 * | 2/2010 | Whiteman ................ B44F 1/10 283/107 |
| 2010/0230615 | A1 * | 9/2010 | MacPherson ............. B44F 1/10 250/488.1 |
| 2011/0095518 | A1 | 4/2011 | Hoffmuller et al. |
| 2012/0156446 | A1 | 6/2012 | Brehm et al. |
| 2012/0299287 | A1 * | 11/2012 | Eichenberger ........... G07D 7/12 283/85 |
| 2014/0312606 | A1 * | 10/2014 | Lister .................... B42D 25/29 283/85 |

FOREIGN PATENT DOCUMENTS

| | | |
|---|---|---|
| CA | 2717775 A1 | 9/2009 |
| EP | 0229646 A2 | 7/1987 |
| EP | 1294576 B1 | 9/2008 |
| EP | 1567713 B1 | 4/2009 |
| WO | 98/50241 A1 | 11/1998 |
| WO | 2008/031170 A1 | 3/2008 |
| WO | 2008/135174 A1 | 11/2008 |
| WO | 2010/043846 A1 | 4/2010 |
| WO | 2010/049676 A1 | 5/2010 |
| WO | 2011/057759 A1 | 5/2011 |
| WO | 2013/137223 A1 | 9/2013 |

OTHER PUBLICATIONS

Mar. 13, 2014 Search Report issued in British Patent Application No. GB1401761.0.
Jun. 25, 2013 Search Report issued in British Patent Application No. GB1301788.4.
Jun. 11, 2014 Written Opinion issued in International Patent Application No. PCT/GB2014/050283.
Jan. 2, 2017 Third Party Observation submitted in European Application No. 20140702938.

* cited by examiner

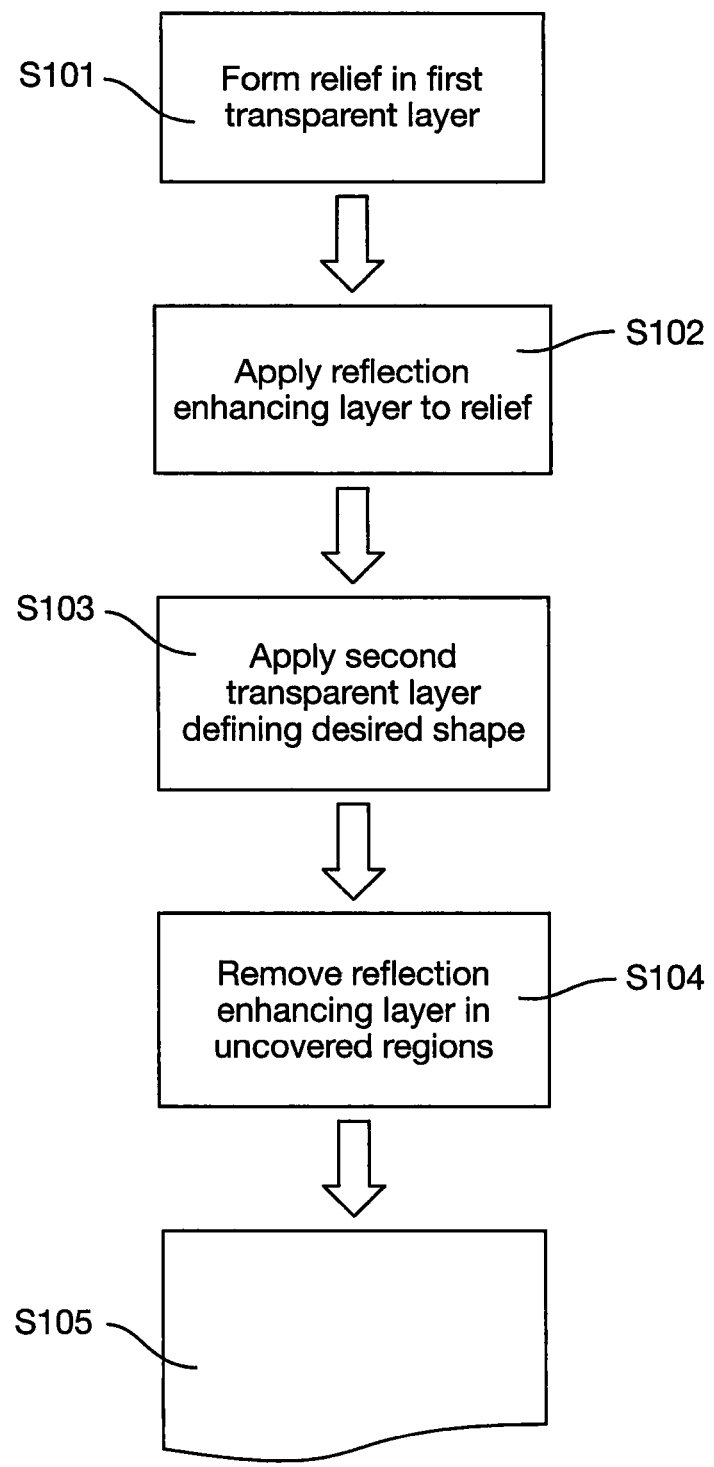

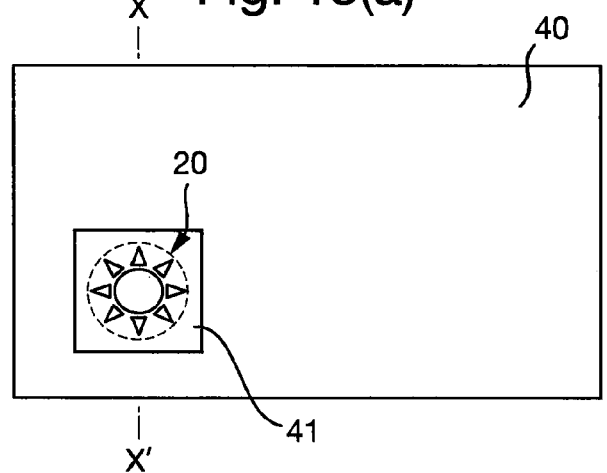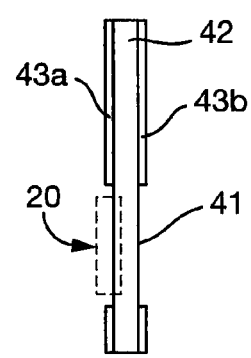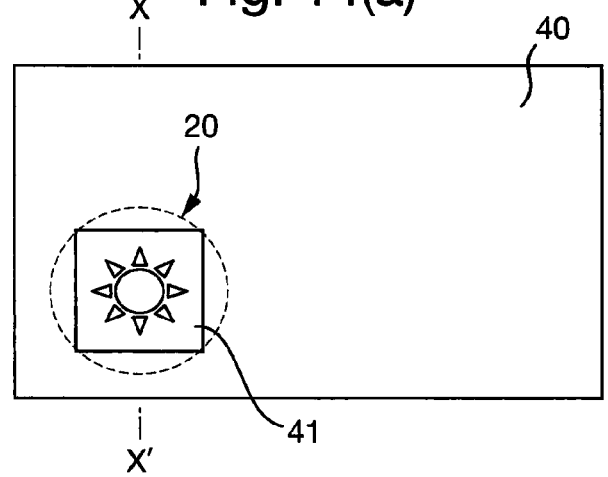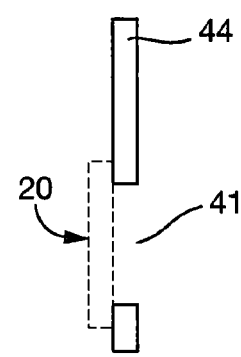

SECURITY DEVICES AND METHODS OF MANUFACTURE THEREOF

This invention relates to security devices, suitable for establishing the authenticity of objects of value, particularly security documents, and their methods of manufacture. In particular, the invention relates to security devices incorporating optically variable effect generating relief structures such as holograms and diffraction gratings.

Optically variable effect generating relief structures such as holograms and diffraction gratings have been used widely over the last few years to impart security to documents of value such as banknotes, credit cards, passports and the like. Conventionally, the structure is provided on a transfer foil and then hot stamped from the transfer foil onto the final document substrate. An early example of this approach is described in U.S. Pat. No. 4,728,377.

More recently, such structures have been used in combination with transparent window features formed in the document substrate to allow the optically variable effect to be viewed through the document. The window may take the form of an aperture through one or more layers of the document substrate or may comprise an optically transparent region of the document substrate. An example of an optically variable effect generating relief structure located in a window region formed as an aperture in a document is given in CA-C-2163528. An example of an optically variable effect generating relief structure located in a window region formed as a transparent region of a document (here, a polymer banknote) is given in WO-A-2008/031170.

Placing a security device in a window has the advantage that the device can be viewed from both sides of the document. As such it is desirable that a secure visual effect is exhibited by both sides of the security device, in order to increase the difficulty of counterfeiting. Examples of devices in which both sides exhibit a secure effect are disclosed in CA-C-2163528, US-A-2005/0104364, US-A-2007/0114787, CA-A-2717775 and CA-A-2611195. However, there is an ever-present need to improve the security level of such devices in order to stay ahead of would-be counterfeiters.

In accordance with the present invention, a security device is provided comprising a first transparent layer having an optically variable effect generating relief structure formed in a surface thereof; a reflection enhancing layer extending over the relief structure and following the contour of the relief; and a second transparent layer extending over the reflection enhancing layer, the lateral extent of the second transparent layer being less than the whole area of the security device and corresponding to the lateral extent of the reflection enhancing layer, wherein the first and/or second transparent layer comprises one or more optically effective substances such that the appearance of the optically variable effect generated by the relief structure is different when viewed through the first transparent layer compared with when viewed through the second transparent layer, at least under illumination at a wavelength at which at least one of the optically effective substance(s) is visible.

By arranging the reflection enhancing layer and the second transparent layer to have the same lateral extent which is less than the whole area of the device (i.e. so that the device also includes at least one region where the reflection enhancing material and second transparent layer are absent, which is preferably transparent—for instance the lateral extent of the reflection enhancing layer and the second transparent layer may be less than the lateral extent of the first transparent layer), the device appears to present two different secure visual effects (one visible from each side of the device), in exact register with one another. When viewed through the first transparent layer, the colour of the optically variable effect is dictated by that of the first transparent layer (if any), in combination with that of the reflection enhancing layer. The second transparent layer is concealed exactly by the reflection enhancing layer and does not contribute to the appearance. When the device is viewed from the opposite side, through the second transparent layer, the colour of the optically variable effect appears different, being due to the combination of the second transparent layer with the reflection enhancing layer. From this viewpoint, the first transparent layer does not contribute to the appearance of the optically variable effect, being concealed again by the reflection enhancing layer (although the first transparent layer may be visible in laterally offset regions, e.g. surrounding the optically variable region). Thus the impression of two different yet precisely registered devices can be achieved through the provision of a single device in a manner which is very difficult to imitate.

It should be noted that the term "colour" used herein should be taken to encompass optical effects which are invisible under ambient illumination conditions (i.e. visible illumination wavelengths), and become apparent only under illumination at specific non-visible wavelengths such as UV or IR, as well as colours which are visible in visible light. In addition the term "colour" encompasses all hues and tones which are visible, including black, grey and silver as well as chromacities such as red, blue, green etc.

The term "transparent" means that the material in question is substantially clear, with low optical scattering—i.e. items on one side of the material can be seen through it, from the other—but not necessarily colourless. For instance, a transparent material may carry a coloured tint.

Each of the first and second transparent layers could comprise optically effective substances. However, in preferred embodiments, only one of the first and second transparent layers comprises an optically effective substance, the other of the first and second transparent layers appearing colourless under illumination of any wavelength. In particular it is advantageous if only the second transparent layer comprises an optically effective substance. Should the first transparent layer be visible from the second side of the device (e.g. in regions of the device laterally offset from the reflection enhancing layer), the colourless appearance of the first transparent layer will not detract from or compete with the colour of the second transparent layer. The optically variable effect may appear invisibly "suspended" within the device from both sides.

However, in other preferred embodiments, each of the first and second transparent layers comprise different optically effective substances. This may encompass both transparent layers having one or more common optically effective substances, but one or other of the layers will contain at least one optically effective substance which the other does not. For instance, both transparent layers may comprise the same UV-responsive substance, whilst only the second transparent layer is provided with a visible colourant.

In particularly preferred embodiments, the first and/or second transparent layers comprise one or more optically effective substance(s) which impart a coloured tint to the respective layer, which colour is visible under illumination at visible wavelengths. In this way the two different appearances of the device can be checked for without the need for any special illumination. In some preferred cases, the first transparent layer has a visible coloured tint of a first colour, and the second transparent layer has a visible coloured tint of a second, different colour. Advantageously the two colours contrast strongly with one another, e.g. yellow and blue.

In further preferred embodiments, the first and/or second transparent layers comprise one or more optically effective substance(s) which are visible only under illumination at selected wavelengths outside the visible spectrum, preferably ultraviolet or infrared wavelengths. This provides for a more covert security feature which can be checked by eye or by machine.

In still further preferred embodiments, the first and/or second transparent layers comprise one or more optically effective substance(s) which undergo a change in appearance in response to changes in one or more of temperature, pressure, strain or electrical potential. For example, thermochromic, piezochromic or electrochromic substances could be used. In each case the varying appearance of the substance may be visible within or outside the visible spectrum, and may change from one to the other.

Preferably, the optically effective substance(s) comprise dyes and/or pigments. Dyes are preferred in order to preserve the optical clarity of the layer(s).

The optically effective substance(s) could be provided uniformly across the respective layer. However in preferred embodiments the complexity of the security device may be further enhanced by arranging one or more of the substances to appear as a pattern. Thus, preferably, the second transparent layer comprises at least two transparent materials arranged in a pattern, at least one of the transparent materials comprising an optically effective substance such that the appearance of the optically variable effect generated by the relief structure is modified by the pattern when viewed through the second transparent layer, at least under illumination at a wavelength at which the optically effective substance is visible. For example, the first material, containing a colourant or similar, could be laid down in the shape of a symbol or letter, and the second material (which may contain a different colourant or may be colourless) may be laid down in register surrounding the first material to complete the second transparent layer. Advantageously, the at least two transparent materials each comprise a different optically variable substance, which can be distinguished from one another by the human eye or by machine.

The second transparent layer preferably comprises one or more polymeric materials, such as vinyl resins, most preferably having one or more optically effective substance(s) dispersed therein as discussed above. Particularly advantageously, the second transparent layer comprises a resist material which is resistant to etchant suitable for removing material of the reflective layer from the device. This enables the security element to be manufactured using the particularly beneficial techniques discussed below. For example, where the reflective layer is formed of a metal, the second transparent layer is preferably resistant to an etchant able to dissolve the metal, e.g. sodium hydroxide which is able to etch aluminium. If the second transparent layer is made up of two or more transparent materials, preferably both provide substantially the same etch resistant properties.

The second transparent layer preferably is of sufficient thickness so as to protect the reflective layer during etching and hence in advantageous embodiments has a thickness of between 0.5 and 5 microns, more preferably between 1 and 2 microns.

Advantageously, the second transparent layer is a printed layer, preferably formed by gravure printing, flexographic printing or slotted die printing. In this way, the second transparent layer can be laid down in any desirable form through control of the printing apparatus using well-known printing techniques. Gravure printing is most preferred due to the high resolution that is achievable.

The lateral extent of the reflection enhancing layer and second transparent layer may or may not be related to that of the relief structure, which may itself extend over the whole device or not. For instance, whilst in some embodiments the lateral extent of the reflection enhancing layer and second transparent layer matches that of the relief structure, in more preferred embodiments the two do not match, e.g. their perimeters do not confirm to one another to within 100 microns. In other words, either at least a portion of the reflection enhancing layer (and second transparent layer) is located outside the relief structure, or the reflection enhancing layer (and second transparent layer) is absent over at least a portion of the relief structure, or both. In particularly preferred embodiments, the reflection enhancing layer (and second transparent layer) extends beyond the periphery of the relief structure in at least one, preferably in all, directions, e.g. by at least 100 microns. This is advantageous since the replay exhibited by the relief structure may appear on a plane in front or behind that of the device itself, in which case upon tilting, the replayed image will move relative to the device. By continuing the reflection enhancing layer beyond the relief this enables the full image to be viewed against a reflective background during tilting. The inclusion of a substantially flat reflective region in this way also acts as an additional security feature since it will be bright and eye-catching, thereby further increasing the security level of the device.

In preferred embodiments, the lateral extent of the reflection enhancing layer and second transparent layer defines a secure or decorative shape or pattern, preferably a fine line pattern, or an item of information, preferably a number, letter, alphanumerical text, a symbol or a graphic. Where the second transparent layer is used as an etch resist, this can be achieved through laying down the second transparent layer in the desired form (e.g. by printing).

Preferably, the second transparent layer is registered to the relief structure. That is, the second transparent layer has been laid down in register with the relief structure having the result that the two items will be in substantially the same relative position to one another on each security device made to the same design (e.g. a series of such devices). This increases the difficulty of counterfeiting since a document displaying a different alignment between the optically variable effect and the lateral extent of the reflection enhancing layer and second transparent layer (which will be the same) will be readily distinguished from genuine devices.

As noted above, the reflection enhancing layer and second transparent layer could define any shape or pattern and in preferred examples the reflection enhancing layer (and the second transparent layer, since this will have the same lateral extent) includes at least two laterally offset regions which are visibly discontinuous. This increases the complexity of the device and hence the difficulty of forgery.

In many preferred embodiments, the reflection enhancing layer is substantially opaque such that the second transparent layer cannot be seen therethrough. However, in other embodiments, the reflection enhancing layer may be semi-transparent, achieved for example through the use of an extremely thin layer of reflection enhancing material. In this case the second transparent layer may be apparent through the reflection enhancing material when the device is viewed in transmitted light. However, in all cases the second transparent layer should be substantially hidden by the reflection enhancing material when the device is viewed in reflection through the first transparent layer.

By arranging the reflection enhancing layer to be semi-transparent in this way, additional effects can be achieved. For example, the apparent colour of the security device viewed from one side may be different depending on whether the device is being viewed in reflected or transmitted light. When viewed in reflection through the first transparent layer, the light reflected by the reflection enhancing layer dominates the appearance of the device and effectively conceals the colour of the second transparent layer behind it such that the device appears to have the colour of the reflection enhancing layer (modified by any additional colour in the first transparent layer). When viewed in transmission from the same side, the different colour of the second transparent layer will be visible through the reflection enhancing layer, thereby appearing to change the colour of the device. If both the first and second transparent layers are provided with a (different) optically effective substance, when viewed in transmission these will combine with one another to produce a third colour which is different again.

The reflection enhancing layer may be formed as a continuous layer in each region of the shape or pattern to be defined. In other embodiments, the reflection enhancing layer may comprise a screened working of discontinuous elements. Typically such elements would be too small to be individually discerned by the naked eye. The second transparent layer would by definition be arranged according to the same screen. In this way the optically variable effect may appear semi-transparent from both sides of the device, in reflection and/or transmission. However it should be noted that this configuration will not lead to the additional colour effect described above unless the reflection enhancing layer is also formed sufficiently thinly so as to be intrinsically semi-transparent.

In particularly preferred implementations, the reflection enhancing layer comprises one or more metals or alloys thereof, preferably copper, aluminium, nickel, chrome or any alloys thereof (e.g. nickel-chrome alloys). Metal reflective layers, preferably laid down by vacuum deposition (encompassing sputtering, resistive boat evaporation or electron beam evaporation for example), or by chemical vapour deposition, achieve highly specular reflection and hence a very bright replay of the optically variable effect. In other advantageous implementations, the reflection enhancing layer could comprise any of:
  an optical interference thin film structure;
  a layer containing metallic particles, optically variable particles or optically variable magnetic particles;
  a photonic crystal layer; or
  a liquid crystal layer.

Such materials can be used to provide the device with additional visual effects, e.g. exhibiting different colours at different viewing angles ("colour shift"), which will appear superimposed on the visual effect produced by the relief structure.

The reflection enhancing layer follows the contour of the relief structure on both of its surfaces such that the optically variable effect is exhibited by both sides. In order to achieve this, the reflection enhancing layer preferably has a thickness less than the profile depth of the relief structure. For example, typical diffractive relief structures such as holograms may have profile depths of the order of 50 to 500 nm, more often between 80 and 150 nm. In contrast, the reflection enhancing layer preferably has a thickness between 5 and 100 nm. For instance, a layer of aluminium having a thickness of around 15 to 30 nm is suitable for providing a virtually fully opaque reflective layer. A layer of aluminium with a thickness around 5 to 10 nm can be used to provide a semi-transparent reflection enhancing layer.

Preferably, the optically variable effect generating relief structure comprises a diffractive device such as a hologram, a diffraction grating or a Kinegram™, or a non-diffractive micro-optical structure such as a prismatic structure. Non-diffractive optical structures typically are of much larger dimensions to those mentioned above in relation to holographic devices, with profile depths of between 2 and 50 microns. Examples of prismatic structures suitable for the current invention include, but are not limited to, a series of parallel linear prisms with planar facets arranged to form a grooved surface, a ruled array of tetrahedra, an array of square pyramids, an array of corner-cube structures, and an array of hexagonal-faced corner-cubes. A second preferred type of micro-optical structure is one which functions as a microlens including those that refract light at a suitably curved surface of a homogenous material such as plano-convex lenslets, double convex lenslets, plano-concave lenslets, and double concave lenslets. Other suitable micro-optical structures include geometric shapes based on domes, hemispheres, hexagons, squares, cones, stepped structures, cubes, sawtooth structures, faceted structures or combinations thereof.

The first transparent layer may take a number of forms depending in part on how the security device is to be incorporated or applied to an object of value. In some preferred examples, the first transparent layer comprises a thermoplastic polymer—for instance forming part of a substrate web of e.g. polyester, or an embossing lacquer carried thereon, which may act as a support for the security device as a whole or even for a security document of which the security device will ultimately form part. In such cases, the relief structure may be formed in the surface of the thermoplastic by conventional embossing techniques using heat and pressure, for example. In other preferred implementations, the transparent layer may comprise a curable polymer, preferably a UV-curable polymer. For instance, the relief could be cast-cured into a coating of UV-curable resin. In still further embodiments, the first transparent layer could comprise a curable thermoplastic polymer (i.e. a thermoplastic polymer with a curing agent added) such that, after embossing, the relief can be fixed by curing.

As noted above, in some embodiments the first transparent layer forms an integral part of a substrate, preferably a security document substrate or a security article substrate. For instance, the relief structure may be embossed directly into a transparent layer making up the substrate of a polymer (or polymer/paper composite) banknote, or forming the substrate of a security article such as a security thread or foil which is later to be incorporated into or applied to a security document or other object of value. In other preferred embodiments, the first transparent layer is disposed on a substrate, preferably a security document substrate or a security article substrate. This is the case for example where the relief is formed in a coating or other layer carried by the substrate, e.g. a cast-cured relief.

If the device is to be formed independently of the security document or other object of value to which it is to be applied, the device preferably further comprises one or more transparent adhesive layers. These may form the outermost layer of the device on either or both sides. By selecting a transparent adhesive, the appearance of the optically variable effect is not diminished.

The invention further provides a security article comprising a security device as described above, the security article preferably comprising a transfer band or sheet, a security thread, a foil, a patch, a label or a strip. Also provided is a security document comprising a security device as described above or a security article as described above, the security document preferably comprising a banknote, cheque, identification document, certificate, share, visa, passport, driver's licence, bank card, or ID card. Preferably the security device is arranged in a window or half-window region of the security document.

Further provided is a method of manufacturing a security device, comprising:
  forming an optically variable effect generating relief structure in a surface of a first transparent layer;
  applying a reflection enhancing material over the relief structure to form a reflection enhancing layer which follows the contour of the relief;
  applying a second transparent layer over the reflection enhancing material; and
  removing the reflection enhancing material from regions of the device in which the reflection enhancing material is not covered by the second transparent layer, such that the lateral extent of the reflection enhancing material corresponds to that of the second transparent layer;
  wherein the first and/or second transparent layer comprises an optically effective substance such that the appearance of the optically variable effect generated by the relief structure is different when viewed through the first transparent layer compared with when viewed through the second transparent layer, at least under illumination at a wavelength at which the optically effective substance is visible.

By using the second transparent layer to define those regions of the reflection enhancing material which are subsequently removed, the lateral extent of the two layers can be accurately matched. As described above, this results in the device exhibiting an optically variable effect on both sides, with a different appearance due to the optically effective substance(s) in the first and/or second transparent layers. This presents the appearance of two different security devices in exact register, achieving a striking visual effect which is extremely hard to counterfeit.

The optically effective substance(s) can take any of the forms mentioned above, and be disposed in the first and/or second transparent layers in the manners already described.

Any forming technique could be used to provide the relief in the first transparent layer. Advantageously, the optically variable effect generating relief structure is formed in the surface of the first transparent layer by embossing or cast-curing, preferably UV cast-curing.

Preferably, the reflection enhancing layer is applied in a continuous layer over the relief structure. However, the reflection enhancing layer could be applied in a patterned manner prior to the deposition of the second transparent layer if desired, e.g. through the use of a repellent coating applied to selected regions of the relief before application of the reflection enhancing material.

The reflection enhancing layer could be applied by any appropriate technique for the material in use, but in preferred examples is applied by vacuum deposition which has been found to achieve particularly good conformity of the reflective material to the relief. In alternative implementations, the reflection enhancing layer could be applied by sputtering or chemical vapour deposition, or printing if for example a metallic ink is used. Any of the properties and characteristics of the reflection enhancing layer described above could be implemented.

Preferably, the second transparent layer is applied by printing, most preferably by gravure printing, flexographic printing or slotted die printing. Printing techniques enable precise control of the shape or pattern in which the second transparent layer is laid down. However, in other embodiments, the second transparent layer could be applied by coating, deposition or transfer techniques. In particularly preferred embodiments, the second transparent layer is applied in register with the relief structure. This can be achieved for example by performing both operations as part of the same, in-line manufacturing process.

Any of the properties and characteristics of the second transparent layer described above may be implemented in the method. For instance, in some embodiments, the second transparent layer may preferably be applied so as to define at least two laterally offset regions which are visibly discontinuous, leading to the same visible discontinuities in the reflection enhancing layer. In further embodiments, the second transparent layer may be applied so as to define a screened working of discontinuous elements.

The reflection enhancing material could be removed using any technique which utilises the second transparent layer to define the regions to be removed. In particularly preferred embodiments, the reflection enhancing material is removed by etching, the second transparent layer acting as an etch resist. For example, where the reflection enhancing material is aluminium, the etchant may be sodium hydroxide. In other examples, the reflection enhancing material could be removed by other means such as laser ablation or ion etching.

Any of the other features of the security device described above may be incorporated through appropriate adaptation of the method.

Where the security device is formed as a security article, the security article including the device may be incorporated into or applied to a security document by any conventional technique, such as hot stamping, cold adhesion, laminating, incorporation into paper-making process, etc. The security device is preferably arranged to overlap at least partially and preferably fully with a window region of the document, e.g. an aperture or a transparent portion, which may be formed before or after incorporation of the security device.

Preferred embodiments of security devices and manufacturing methods in accordance with the present invention will now be discussed and contrasted with comparative examples, with reference to the accompanying Figures, in which:

FIG. 1 schematically depicts a first comparative example of a security article incorporating a security device;

FIG. 6 is a flow diagram demonstrating selected steps in an exemplary method of manufacturing a security device in accordance with the present invention.

Figure 8:
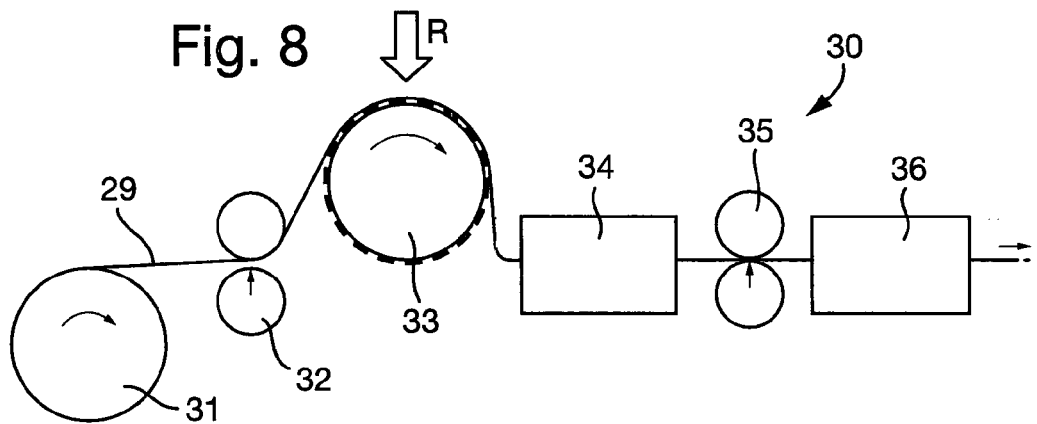
Figure 9:
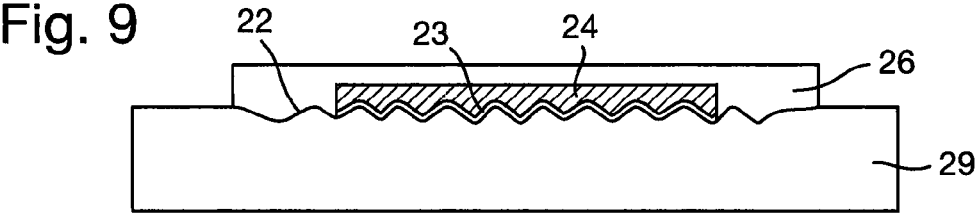
Figure 10:
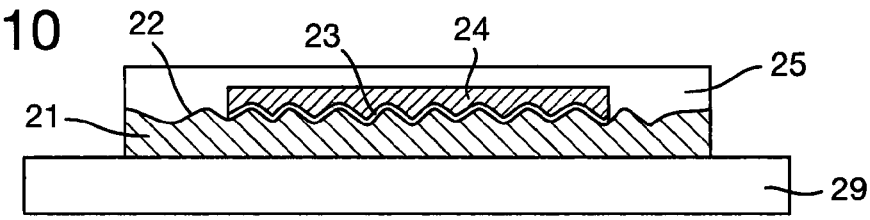
Figure 11:
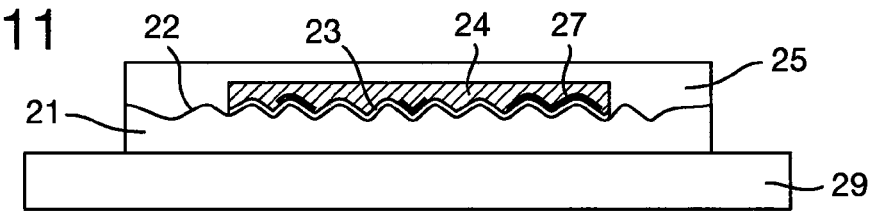
Figure 12:
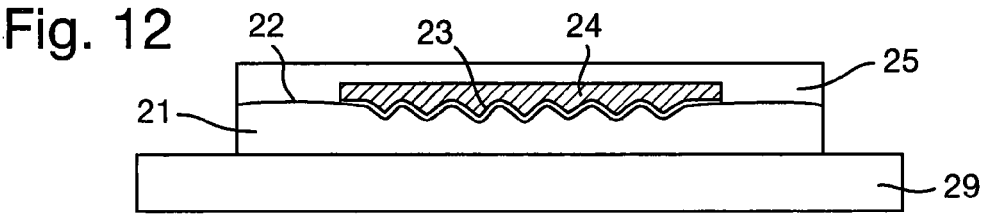
Figure 15A:
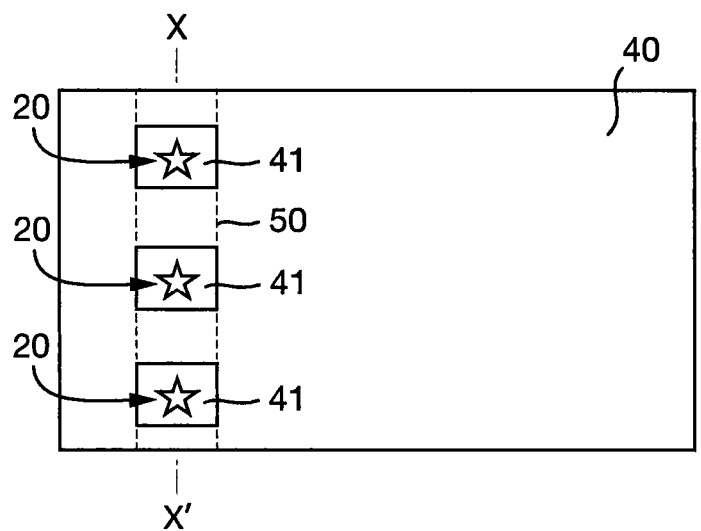
Figure 15B:
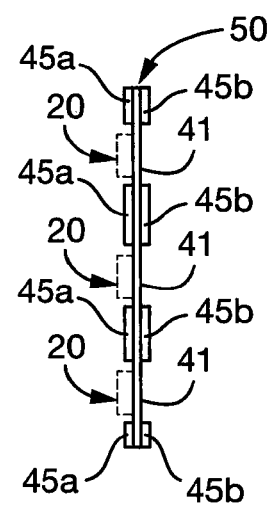
Figure 15C:
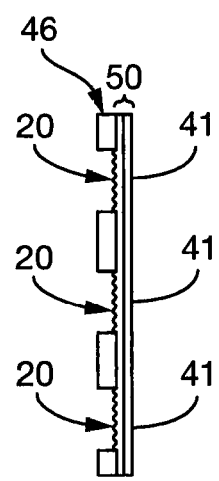
Figure 16A:
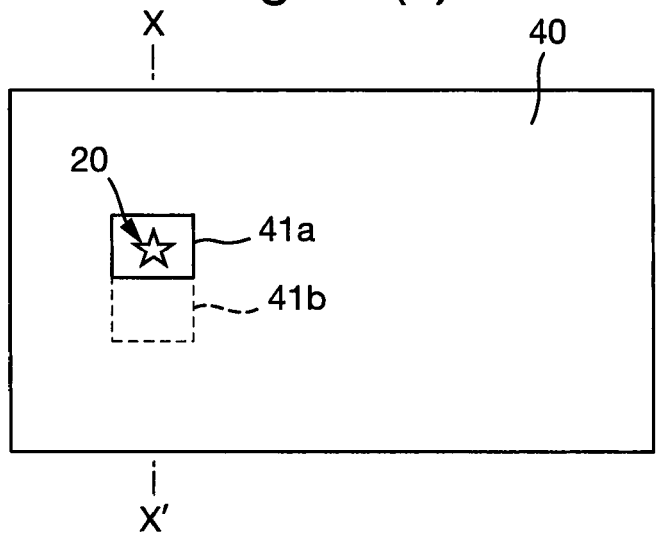
Figure 16C:
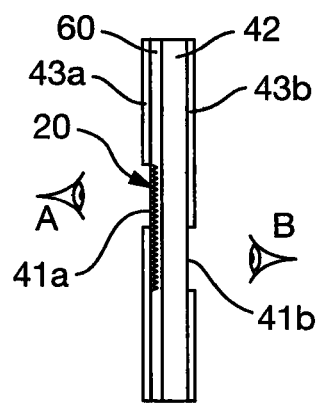
Figure 16B:
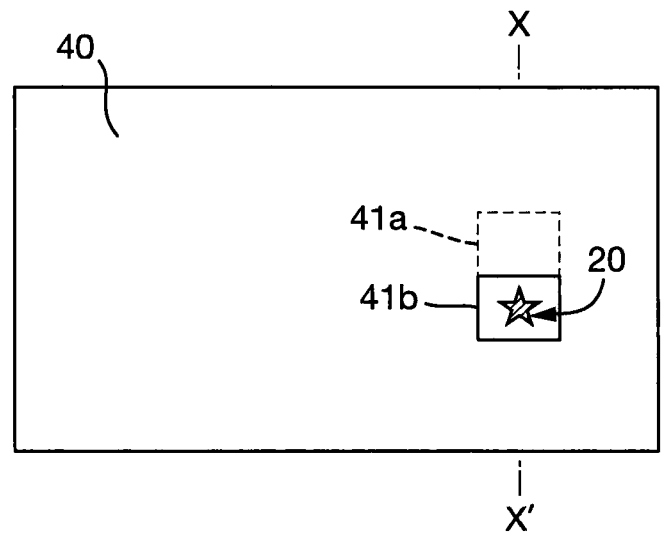
Figure 17A:
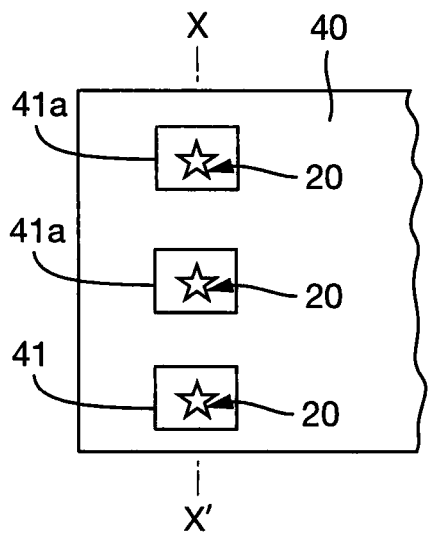
Figure 17B:
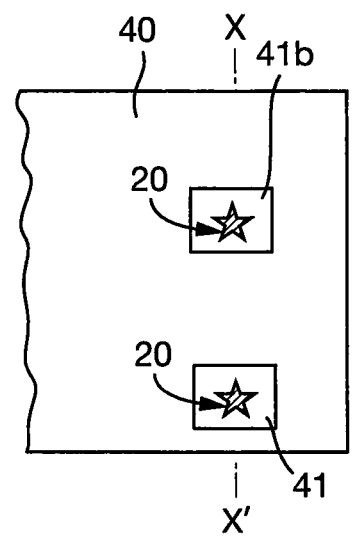
Figure 17C:
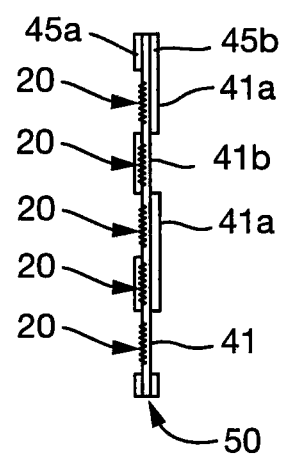

FIGS. 7a to e depict a second embodiment of a security device in accordance with the present invention at various stages of manufacture;

FIG. 8 shows exemplary apparatus suitable for carrying out a method of manufacturing in accordance with the present invention;

FIG. 9 depicts a third embodiment of a security device in accordance with the present invention;

FIG. 10 depicts a fourth embodiment of a security device in accordance with the present invention;

FIG. 11 depicts a fifth embodiment of a security device in accordance with the present invention;

FIG. 12 depicts a sixth embodiment of a security device in accordance with the present invention;

FIGS. 13a and 13b depict an exemplary security document in accordance with the present invention, FIG. 13b showing a cross-section along the line XX' in FIG. 13a;

FIGS. 14a and 14b depict a further exemplary security document incorporating a security device in accordance with the present invention, FIG. 14b being a cross-section along line XX' in FIG. 14a;

FIGS. 15a, 15b and 15c depict a further exemplary security document incorporating a security device in accordance with the present invention, FIGS. 15b and 15c depicting alternative cross-sections of the security document taken along line XX' in FIG. 15a;

FIGS. 16a, 16b and 16c depict another exemplary security document incorporating a security device in accordance with the present invention, FIGS. 16a and 16b showing front and reverse views of the document (flipped about its short edge), and FIG. 16c being a cross section along line XX' in FIGS. 16a and 16b; and FIGS. 17a, 17b and 17c depict a further exemplary security document incorporating a security device in accordance with the present invention, FIG. 17a showing a left portion of the document viewed from the front side, FIG. 17b showing a right portion of the document viewed from the rear side (the document having been flipped about its short edge), and FIG. 17c being a cross section along line XX' in FIGS. 17a and 17b.

The description below will focus on examples of security devices having optically variable effect generating relief structures in the form of holograms. By this we mean the relief is a structure which generates graphical images by the mechanism of diffraction of light. However, more generally the term "optically variable effect" means that an appearance is generated which varies depending on the viewing angle. Other examples of optically variable effects which might be implemented through the described relief structures include diffraction gratings, Kinegrams™ and prismatic effects, as mentioned above.

Figure 1:
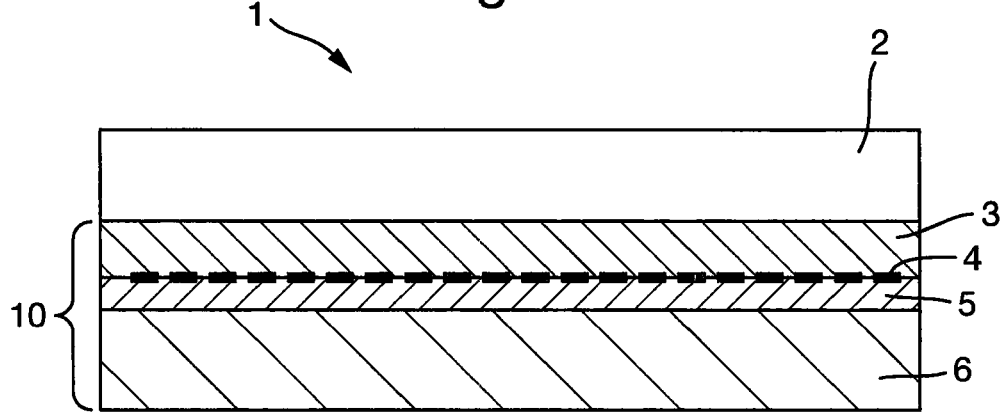

FIG. 1 shows a security article 1 according to a first comparative example. Here the security article 1 may comprise for example a transfer foil, security thread, patch or similar which includes a security device 10 carried on a support layer 2. Typically, the support layer 2 acts as a release sheet or strip from which the device 10 is detached upon application to a security document, in which case the support layer 2 can take any convenient form such as a (opaque, translucent or transparent) polymer or paper web. A release layer (not shown) may be provided between the support layer 2 and security device 10 to assist in the detachment of the security device 10 from the support layer 2 upon application of the device to a security document. For example, where the transfer is to take place by hot stamping, the relief layer may comprise a layer of wax or similar.

The security device 10 comprises a transparent layer 3 into which a holographic (or other optically variable) relief structure 4 is formed. It should be noted that the transparent layer 3 may in practice be formed of multiple layers laminated to one another, and this applies to all "layers" mentioned throughout this disclosure. The transparent layer 3 can be formed of any suitable transparent material in which a relief structure 4 can be formed, for example a conventional embossing lacquer such as a thermoplastic polymer or a radiation curable resin. The transparent layer 3 includes a colorant such as a suitable dye which imparts a tint to the layer 3. The tint may or may not be visible to the human eye under illumination at visible wavelengths. For example, the colorant could be invisible unless irradiated with selected wavelengths outside the visible spectrum, such as UV or IR, and could be phosphorescent, fluorescent or luminescent. However, in the most preferred examples, the colorant is visible under ambient lighting conditions in order that the colour effect is readily apparent without the need for specialist equipment.

The relief structure 4 (shown in FIGS. 1 to 4 schematically as a dashed line) is formed into the layer 3 using an appropriate conventional technique such as embossing under the combined action of heat and pressure, or cast curing, in which the layer 3 is coated as a relatively fluid resin onto the support layer 2 and a shaped die applied to the fluid resin having the desired relief shape. The resin flows to accommodate the die thereby taking on the desired relief shape and is simultaneously or subsequently hardened, e.g. by curing with radiation such as UV. Where the relief 4 is formed by cast curing, the layer 3 typically comprises a single homogenous film of resin. However, where the relief 4 is embossed, the layer 3 more typically comprises multiple layers including at least a protective coating layer (commonly termed a "scuff" layer) which will cover the hologram in use and an embossing layer which is usually of a material which is mechanically softer and/or of lower glass transition temperature than the protective layer. An intermediate layer may also be included. The colorant could be located in any of the multiple layers within layer 3, but most preferably is located in the protective coating and/or intermediate layer (if provided).

Following the formation of the relief structure 4, a reflection enhancing layer 5 such as a metal is applied, preferably by vacuum metallisation. The reflection enhancing layer 5 conforms to the relief structure 4, on both sides. As shown in the Figures, the metallisation covers the full area of the device.

Finally, in this example an optically clear adhesive 6 is applied over the reflection enhancing layer 5 to allow for easy adhesion of the device 10 to a document substrate. However, in other examples an adhesive layer 6 could be provided on the opposite side of the device (between layer 3 and support layer 2), on both sides of the device, or omitted entirely, e.g. if the security device is to be incorporated into a document during the paper-making process, or if adhesive is provided on the document's surface itself.

Figure 2:
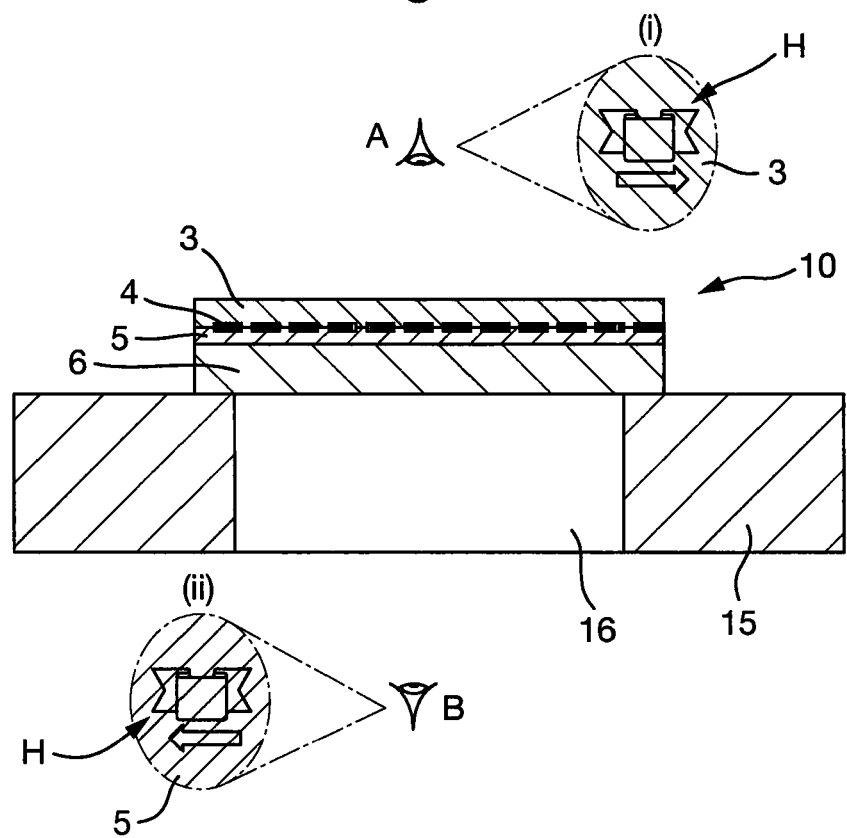
FIG. 2 depicts the security device of FIG. 1 applied to an exemplary security document, together with schematic views of (i) the appearance of the security device viewed by observer A; and (ii) the appearance of the security device viewed by observed B.

FIG. 2 shows the security device 10 now removed from security article 1 and applied to security document 15 in the region of window 16. Here, the security document is of conventional paper construction, having an aperture formed through the document substrate to define the window 16. The security device 10 is arranged to extend across the window 16 and onto the surrounding portions of the document substrate 15 to allow for adhesion between the document and the device. In other cases, the document could include a transparent material in at least one region forming a window 16, as will be described further in later embodiments.

The security device 10 is visible from both sides of the security document 15 as illustrated by observers A and B. From the location of observer A, the optically variable effect generated by relief structure 4 (e.g. a holographic image) in combination with reflection enhancing layer 5 is visible, as denoted in FIG. 2 (i) by the symbol labelled H. The optically variable effect is viewed through the coloured transparent layer 3 and hence the device as a whole including the optically variable effect appears tinted with the colour of layer 3. From the opposite side of the security document 15, observer B sees the same optically variable effect H, as shown in FIG. 2 (ii) although the content of the hologram will appear reversed (i.e. a mirror image of that seen from the position of observer A) due to the fact that the reverse side of relief 4 is being viewed. However, the colour of the optically variable effect and the device as a whole will appear different from that seen in position A since it will be determined solely by the colour of reflection enhancing layer 5 (assuming that the clear adhesive layer 6 is colourless). Thus, two different optically variable appearances can be observed from the two sides of the device. However, since each of the two optically variable appearances occupies the entire window area 16, the relationship between the two effects is not particularly distinct and the overall effect could be imitated through the provision of two different holographic devices of the appropriate colours on the two opposite sides of the document with little difficulty.

Figure 3A:
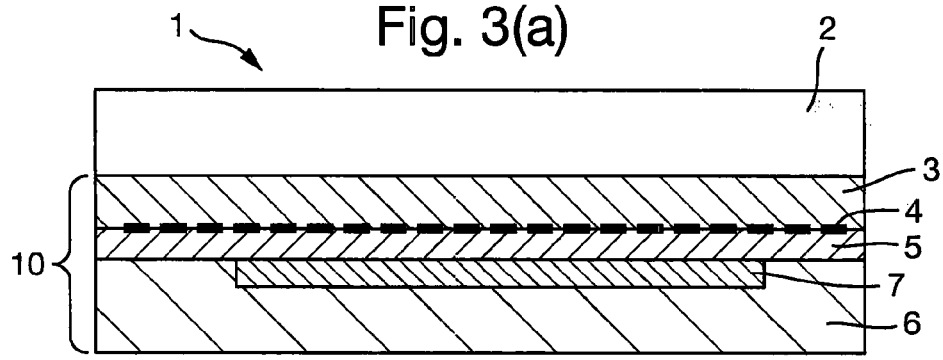
FIGS. 3a and 3b depict two further comparative examples of security articles incorporating security devices.
Figure 3B:
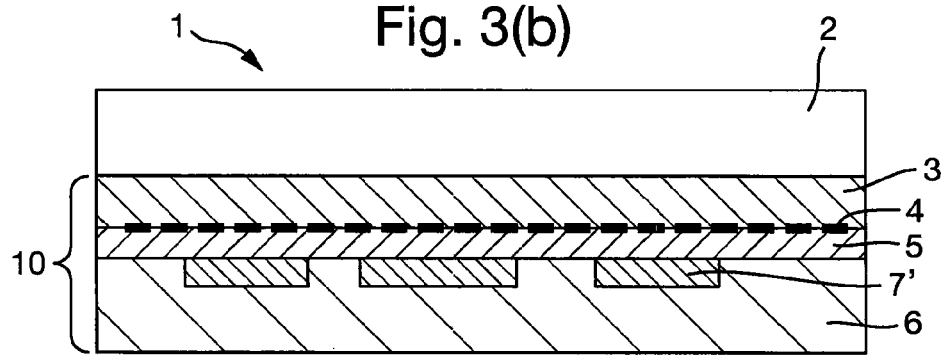

FIGS. 3a and 3b show further comparative examples in which two different optically variable appearances are achieved by providing a coloured print on one side of the reflection enhancing layer in a device. Generally, the reference numbers used in FIGS. 3a and 3b correspond to those used in FIG. 1 and their respective components can be formed in the same way as previously described. However, in this case, the transparent layer 3 into which relief structure 4 is formed need not include a colorant (although it may if desired). After applying the reflection enhancing layer 5 (e.g. by vacuum metallisation), a coloured print 7 is applied by conventional printing techniques. The coloured print 7 may cover the full area of the device, or define a continuous shape as shown in FIG. 3a, or take the form of indicia such as letters, numbers, symbols or graphics, as shown in FIG. 3b.

Figure 4:
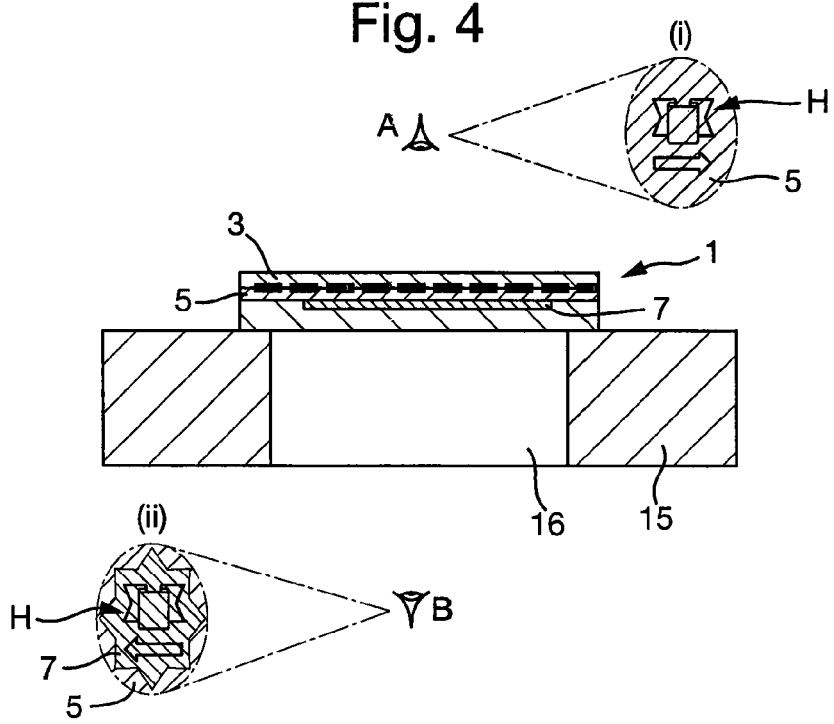
FIG. 4 shows the security device of FIG. 3a applied to an exemplary security document, together with schematic views of (i) the appearance of the security device viewed by observer A; and (ii) the appearance of the security device viewed by observer B.

FIG. 4 depicts the device of FIG. 3a applied to an exemplary security document 15 using any of the same techniques mentioned above. FIG. 4.(i) depicts the appearance of the device from the position of observer A and here the hologram H is seen having the colour of the reflection enhancing layer 5 (e.g. silver). From the opposite side, observer B sees the same hologram H (reversed in direction) but now possessing the coloured tint of print layer 7, which in this case defines a star shape contained within the bounds of the (oval) device. Outside the star shape, the original colour of the reflection enhancing layer 5 will be visible and the optically variable effect will continue. This too is relatively straightforward for a determined counterfeiter to imitate, e.g. through the use of two holograms and appropriate overprinting.

Figure 5:
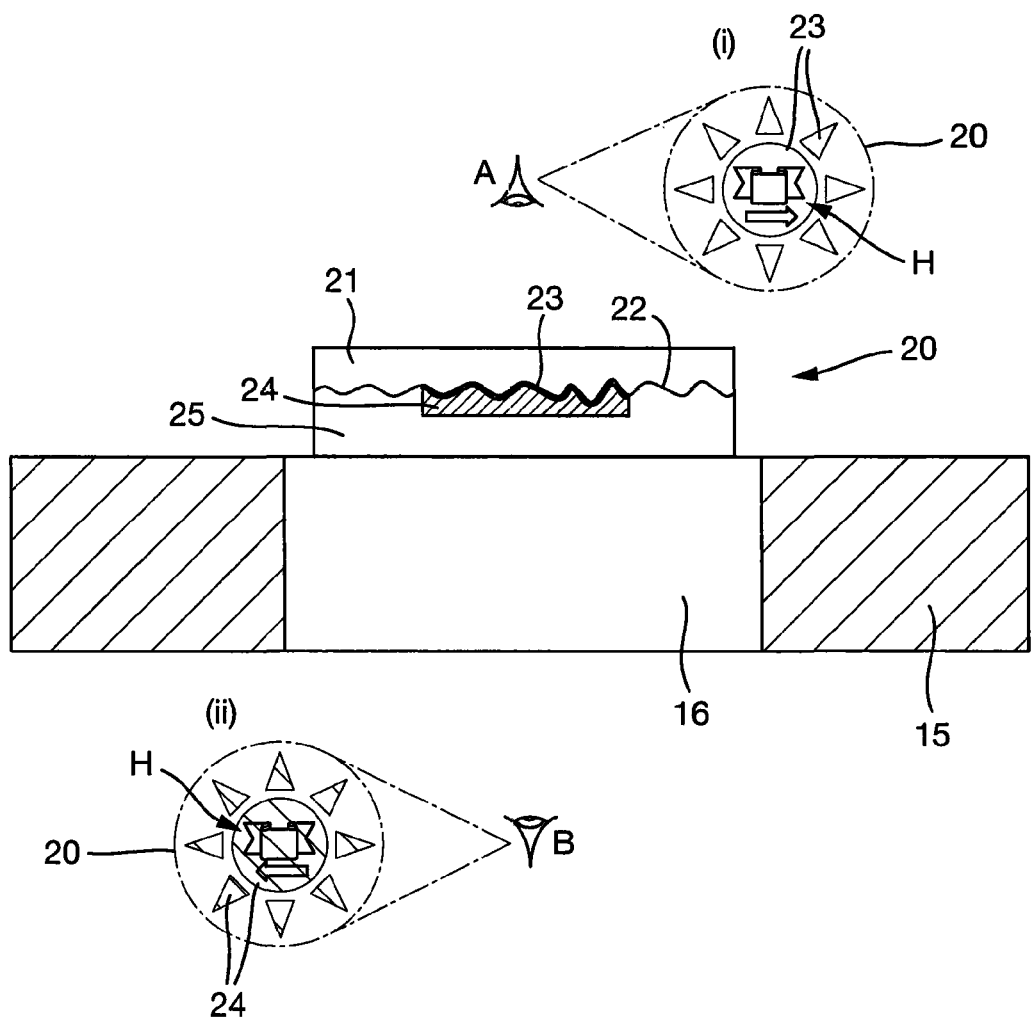
FIG. 5 depicts a first embodiment of the security device in accordance with the present invention applied to an exemplary security document, together with schematic views of (i) the appearance of the security device viewed by observer A; and (ii) the appearance of the security device viewed by observer B.

FIG. 5 depicts a security device 20 in accordance with a first embodiment of the invention, applied to an exemplary security document 15 in the region of a window 16. In this case, window 16 is constituted by a transparent portion of the document 15 with the security device 20 being applied directly thereto. However, the security device 20 could be applied across an aperture in the same way as previously described.

The security device 20 comprises a first transparent layer 21 carrying an optically variable effect generating relief structure 22 formed in its surface. In the Figure the relief structure 22 is depicted as extending across the whole area of device 20, but this is not essential. Conforming to the relief structure 22 is a reflection enhancing layer 23 acting to render the optically variable effect visible from both sides. The reflection enhancing layer 23 does not extend across the full area of the device 20, and in regions of the device where the reflective layer is not provided (i.e. is absent), the optically variable effect of the relief structure 22 (if present) will be substantially invisible. In exact alignment with the reflection enhancing layer 23 is a second transparent layer 24. The second transparent layer 24 has the same lateral extent as the reflection enhancing layer 23 and therefore also does not extend across the full area of the device 20. An optically clear adhesive 25 is used to affix the device onto the document substrate 15. One or both of the first and second transparent layers 21 and 24 includes an optically effective substance, e.g. a colorant such as a dye or pigment, which is visible at least at selected wavelengths which may lie inside or outside the visible spectrum. In the present example, only the second transparent layer 24 comprises such a substance, with the first transparent layer 21 being colourless. For example, the optically effective substance contained in layer 24 may impart a coloured tint, e.g. red, to the layer. The result is that the appearance of the optically variable effect is different from either side of the device. However, the two different optically variable appearances are also clearly shown to be in exact register with one another.

To illustrate this effect, FIG. 5 (i) schematically depicts the appearance of device 20 from the location of observer A. The holographic image H generated by the relief 22 is visible against a background defined by the reflection enhancing layer 23, which in this example is configured to have a "sun" shape with a central circular portion and eight outlying triangular regions spaced from one another and from the central circle. The holographic effect appears having the colour of the reflection enhancing layer 23, e.g. silver. Outside the silver, holographic, sun-shaped region, the device is colourless and transparent, with substantially no optically variable effect, giving the impression that the holographic device is suspended within the window. From the opposite side of the device, observer B sees a different appearance, as depicted in FIG. 5 (ii). The holographic effect H appears against a background which again is defined by the same reflection enhancing layer 23 and thus has exactly the same shape and position as that seen by observer A. However, all of the regions of the sun-shaped feature now appear in a different colour, due to the presence of at least one optically effective substance in transparent layer 24. For example, the optically effective substance could be a red dye in which case the sun-shaped indicia viewed by observer B will appear red.

The result is a particularly effective security device since the impression is given of there being two security devices of different colour in exact register with one another. This would be extremely difficult to imitate utilising two devices since the necessary level of registration would not be obtainable. As a result, the security level is significantly enhanced.

A preferred method for manufacturing a security device such as that shown in FIG. 5 will now be discussed with reference to FIGS. 6 and 7. FIG. 6 is a flowchart depicting selected steps of the method. FIGS. 7a to 7e depict a security device in accordance with a second embodiment of the present invention, made according to the described method, at various stages of production for cross reference with FIG. 6.

In the first step S101, an optically variable effect generating relief structure 22 is formed in the surface of a first transparent layer 21. In the example depicted in FIG. 7a, the first transparent layer 21 is carried on a substrate 29. Substrate 29 may for example form a support layer of a security article (such as layer 2 in FIG. 1), or could be an integral part of a security document, e.g. a polymer banknote substrate, or a layer of an identity card. If substrate 29 is to remain in situ when the device is put in circulation, the substrate 29 should be transparent at least in regions at which the security devices are to be formed. The substrate could however be opaque in other regions, e.g. carrying one or more opacifying layers defining window regions in which the devices are to be formed.

The first transparent layer 21 may comprise for example a thermoplastic layer such as polyesterpolyethylene teraphthalate (PET), polyethylene, polyamide, polycarbonate, poly(vinylchloride) (PVC), poly(vinylidenechloride) (PVdC), polymethylmethacrylate (PMMA), polyethylene naphthalate (PEN), polystyrene, or polysulphone; or an embossing lacquer layer, such as a PMMA-based resin. In this case, the relief structure 22 may be formed through a conventional embossing process, e.g. involving forming the surface relief 22 by impressing a cylindrical image forming die (e.g. an embossing roller) into the thermoplastic layer 21 through the combined action of heat and pressure. Alternatively, the transparent layer 21 could be a cast cure resin. For example, the layer 21 may be applied as a viscous liquid coating or film of monomer which is contacted by an image forming die or roller. The surface relief is cast into the film by the simultaneous or near simultaneous exposure of the layer 21 to radiation (e.g. UV radiation), causing polymerisation. The surface relief 22 is thus set into the layer 21. UV curable polymers employing free radical or cationic UV polymerisation are suitable for the UV casting process. Examples of free radical systems include photo-crosslinkable acrylate-methacrylate or aromatic vinyl oligomeric resins. Examples of cationic systems include cycloaliphatic epoxides. Hybrid polymer systems can also be employed combining both free radical and cationic UV polymerization. Cast cure processes such as this are particularly preferred where the substrate 29 has a relatively low glass transition or softening temperature, e.g. biaxially orientated polypropylene (BOPP) which softens at temperatures around 85° C. Structures embossed into such materials may be vulnerable to damage should the device encounter high temperatures during circulation.

Figure 7A:
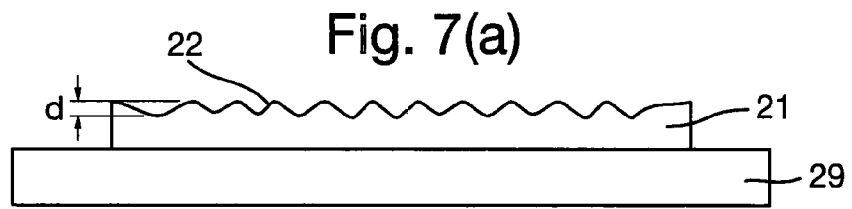
Figure 7B:
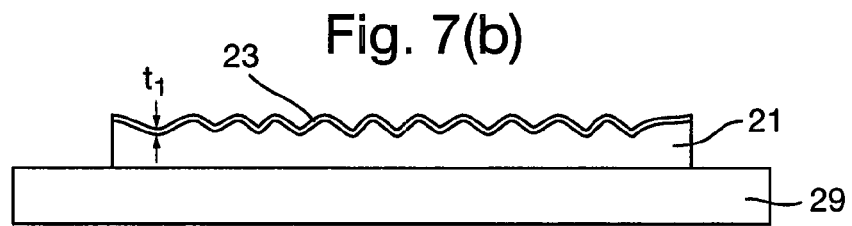
Figure 7C:
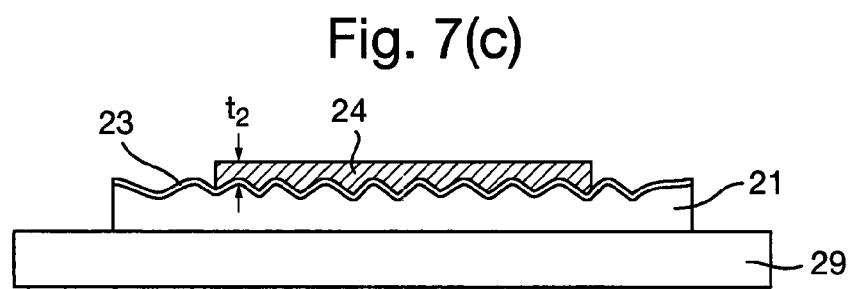

In the next step S102, a reflection enhancing material is applied to the relief 22 to form a reflection enhancing layer 23 (FIG. 7b). The reflection enhancing layer conforms to the surface relief 22 and this is replicated in the reflection enhancing layer's opposite side, thus rendering the optically variable effect visible from both sides of the device. In order to achieve good conformity, the thickness $t_1$ of the reflection enhancing layer 23 is preferably less, more preferably substantially less, than the profile depth d of the relief profile 22. For instance, the relief 22 may have a profile depth d of between 50 and 500 nm, whilst the reflective layer 23 may have a thickness of between 10 and 100 nm, preferably 15 to 30 nm. In some cases the thickness of the reflection enhancing layer may be kept very thin, e.g. 5 to 10 nm, in order to render it semi-transparent. This provides for the possibility of a further colour effect whereby the apparent colour of the device changes when viewed from the same side in reflected as compared to transmitted light.

In order to obtain bright holographic replay, the reflection enhancing layer is preferably a metal layer formed of one or more metals and/or alloys, e.g. aluminium, copper, nickel and/or chrome (or any alloy thereof). If desired, two or more metals or alloys could be laid down in a pattern of different regions to collectively form the layer 23, as described in EP-A-1294576. In other cases, the reflection enhancing material could comprise an optical interference thin film structure, a layer containing metallic particles, optically variable particles or optically variable magnetic particles, a photonic crystal layer, or a liquid crystal layer. Materials of this sort not only provide the requisite reflective properties but may impart an additional optical effect to the device, e.g. exhibiting different colours depending on the angle of view. For example, the reflection enhancing layer could comprise a multilayer structure of alternating high and low refractive index dielectric layers resulting in an optical interference structure which exhibits different colours when viewed in reflection as compared with when viewed in transmission.

The reflection enhancing material(s) could be laid down by any appropriate technique but vacuum deposition is preferred. It should be noted that whilst typically the reflection enhancing layer 23 will be applied directly to the first transparent layer 21 and therefore will be in contact with the surface of the element in which the relief structure 22 is formed, the reflection enhancing layer 23 could be spaced from that element by an intermediate transparent layer or the like, provided that the intermediate layer is sufficiently thin so that the reflection enhancing layer again follows the surface relief contour.

In step S103, a second transparent layer 24 is applied over the reflection enhancing layer 23 across a defined region which is less than the full area of the device (e.g. less than the full lateral extent of the first transparent layer 21). The second transparent layer 24 is preferably laid down in the form of a decorative or secure shape or pattern, such as letters, numbers, symbols or other indicia, or a shape or fine line pattern. To form a security device such as that shown in FIG. 5, the second transparent layer 24 is laid down in the "sun-shaped" arrangement previously described. As in this example, it is preferable that the shape or pattern includes at least two visibly discontinuous regions—i.e. areas of the pattern which are sufficiently large and spaced by a sufficient distance that they can be individually distinguished by the naked eye—such as the central circular region and surrounding triangular areas depicted in FIG. 5. This increases the complexity and visual impact of the design. Within each such region (which appears continuous and unbroken, to the naked eye), the second transparent layer can be applied in a contiguous, all-over layer, or could be applied as a screened working—that is, an array of spaced screen elements. The dimensions of such a screen are typically sufficiently small that the elements cannot be individually distinguished by the naked eye, and the region appears as if the layer is continuous. Nonetheless, this can be used to make the device semi-transparent since light can be transmitted through the screen.

In order to achieve a high degree of control over the arrangement of the second transparent layer 24, the material is preferably laid down using a printing technique such as gravure printing. However, other application techniques such as coating, deposition or transfer methods could be used as appropriate. In this example, the second transparent layer 24 includes an optically effective substance such as a colorant typically in the form of a dye or pigment (a dye is preferred in order to preserve the optical clarity of the layer). Various different types of colorant may be used which may or may not be visible to the human eye under normal illumination conditions. For example, the colorant could be visible or detectable only under selected non-visible radiation wavelength such as ultraviolet or infrared. However, in the most preferred embodiments, the colorant is visible under ambient white light and imparts a coloured tint to the layer 24, e.g. red, blue, green etc.

If desired, a multi-coloured arrangement of transparent materials containing different colorants could be used to form the layer 24. For example, one half of the layer 24 may appear red, whilst the other laterally offset half may appear blue, resulting in a visible pattern. In some cases, the entire layer 24 may have the same visible colour, with selected portions thereof additionally carrying a UV or IR active substance. The different colours could be arranged in any desired pattern, e.g. defining indicia, or different colours could be used to highlight different regions of the optically variable area. For instance, referring to the FIG. 5 embodiment, the central circular region of the "sun" shaped symbol may carry a red-coloured portion of layer 24 whilst the surrounding triangle shaped regions may appear yellow. Each individual area of the layer 24 may also contain more than one optically effective substance, e.g. a visible colorant and a substance which is only visible under UV or IR illumination. Some individual areas of layer 24 could contain no optically effective substance. Patterned arrangements such as this can be achieved by laying down two or more transparent materials, at least one containing an optically effective substance, in registration with one another in accordance with the desired design, e.g. by printing.

Any of the optically effective substances may if desired be responsive to non-optical stimuli such as temperature, pressure, strain, electrical potential or any combination thereof. For instance, the substance could be thermochromic, piezochromic or electrochromic, undergoing a change in appearance as the relevant parameter changes. In this case, the optically effective substance may only be visible or detectable under certain stimulus conditions (e.g. within a certain temperature range).

The colorant or other optically effective substance is dispersed within a clear material to make up layer 24, such as a polymeric binder or resin. Suitable examples include vinyl resins such as UCAR™ VMCA Solution Vinyl Resin or UCAR™ VCMH Solution Vinyl Resin, both of which are supplied by The Dow Chemical Company and which are carboxy-functional terpolymers comprised of vinyl chloride, vinyl acetate and maleic acid. Most preferably, the material forming layer 24 is suitable for acting as a etch resist, with the layer 24 protecting the reflection enhancing layer 23 during a subsequent etching step S104, shown in FIG. 7d, in which those regions of the reflection enhancing layer 23 which are not covered by the second transparent layer 24 are removed. Where the reflection enhancing layer 23 is a metal, typically this removal step is achieved by immersing the structure in an etchant solution which dissolves or otherwise removes the uncovered metal. For example, where the reflection enhancing layer is aluminium, sodium hydroxide can be used as the etchant. Where the reflective layer is copper, an acidic etchant is typically used, such as (i) a mixture of Hydrochloric acid 50% v and Ferric chloride (40 Baume) 50% v, at room temperature; or (ii) a mixture of Sulphuric acid (66 Baume) 5-10% v and Ferrous sulphate 100 g/liter, at 40 to 60 degrees C. Other etchants may also be used such as nitric acid but generally the above systems are the most convenient to work with. The exemplary materials mentioned above for forming the second transparent layer 24 (UCAR™ VMCA and UCAR™ VMCH) are suitable etch resists for both of these etch systems. In order to fully protect the reflection enhancing layer 23, the second transparent layer 24 preferably has a thickness of $t_z$ the order of 0.5 to 5 microns, more preferably 1 to 2 microns. However, the thickness required will depend on the selected materials and etchant.

Other techniques such as laser ablation or (reactive) ion etching could be used to remove the uncovered material of the reflection enhancing layer and these may be particularly preferred where the layer is not solely a metal or alloy layer, such as metallic ink or an interference layer structure as mentioned above. In each case the second transparent layer would still be used to define the bounds of the area in which the layer is removed. Where the reflection enhancing layer is an interference thin film structure (e.g. metal/dielectric/metal), etching techniques may be used for removal in the same manner as a metal reflective layer. In this case, not all the layers of the interference thin film structure may be removed by the etching.

Figure 7D:
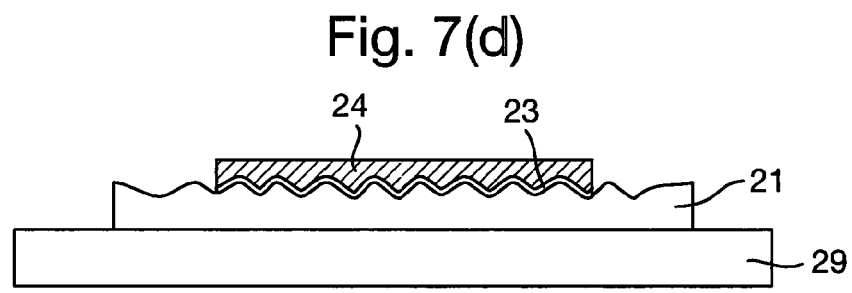
Figure 7E:
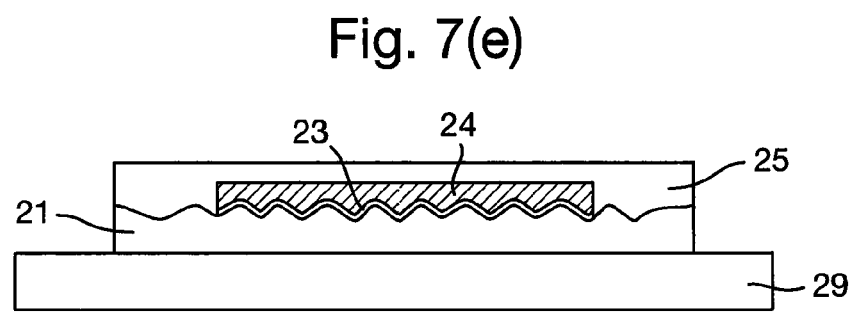

The device shown in FIG. 7d is thus complete, with different optically variable appearances being exhibited by each side of the device. Subsequent processing steps represented by box S105 in FIG. 6 are optional and will depend on how the device is to be applied to or incorporated into a document of value or other object. In a preferred example, as illustrated in FIG. 7e, an optically transparent adhesive 25 is applied over the first and second transparent layers for subsequent adhesion to surface of a document or other object to be protected. Suitable transparent adhesive substances may contain components such as urethanes, methacrylates and carboxy-functional terpolymers (such as UCAR™ VMCH and YMCA). WO-A-2008/135174 also discloses examples of transparent adhesives. In other cases, the adhesive 25 may be omitted entirely or could be provided on the opposite side of the device (adjacent first transparent layer 21), or on both sides of the device.

FIG. 8 schematically depicts an example of apparatus suitable for carrying out the method described with respect to FIGS. 6 and 7. A substrate web 29 is provided from drum 31. The substrate web 29 may constitute a support layer such as layer 2 described with respect to FIG. 1, from which the security device will ultimately be detached, or could form an integral part of the final security device, article or document, in which case substrate web 29 should be transparent at least in the regions where the security devices are to be applied, e.g. a web of polymer film such as BOPP. The substrate 29 is conveyed in this example through a first printing or coating station 32 in which a radiation curable resin is applied to the substrate 29, constituting first transparent layer 21. The resin could be applied in patches or as a continuous, all over film. The substrate web 29 carrying first transparent layer 21 is then held in contact with an embossing roller 33 equipped with an imprint of the desired relief structure 22.

The relief structure 22 is cast into the resin layer 21, preferably in register with the applied patches of resin, and simultaneously cured by the application of appropriate radiation, e.g. UV, represented by arrow R.

The substrate web 29, now carrying structures of the form shown for example in FIG. 7a, is then conveyed into a metallisation chamber 34 in which a reflection enhancing layer 23 is applied, e.g. by vacuum deposition. The reflection enhancing material e.g. metal, or an interference thin film structure, is applied all over the substrate web and the device structures it carries.

Next, a second printing or coating station 35 is used to apply a second transparent layer 24 over the reflection enhancing layer 23, e.g. by gravure printing. As described above, the second transparent layer 24 is preferably laid down so as to define a decorative and/or secure shape such as indicia or a fine line pattern. Depending on the nature of the material used to form layer 24, the material may require drying or hardening (e.g. UV curing) prior to onward processing, and appropriate apparatus may therefore be provided after print station 35 (not shown). Finally, the substrate web 29 is conveyed into removal chamber 36, e.g. an etchant tank, for removal of those regions of the reflection enhancing layer 23 which are not masked by second transparent layer 24. At the output side of chamber 36, the substrate web 29 will carry structures such as that shown in FIG. 7d. The substrate web 29 may go on to additional processing steps such as the application of a transparent adhesive 25, cutting into individual security articles and/or direct incorporation into a security document, examples of which will be given below. For instance, where the substrate 29 is to form the substrate of a polymer (or polymer/paper composite) banknote, following etching, the substrate may undergo further printing steps during which one or more opacifying layers may be applied to the substrate around the formed devices (if not already present on the substrate web), resulting in the devices being situated in window regions, followed by graphics printing and ultimately cutting into individual notes.

The apparatus depicted in FIG. 8 is an example of an inline manufacturing process and provides the advantage that the various printing and embossing steps can be carried out in register with one another. For instance, as mentioned above, the relief structures 23 on embossing cylinder 33 are preferably in register with the resin applied at print or coating station 32 and may also be in register with the second transparent layer 24 applied at print/coating station 35. By applying the features in register with one another, their relative positions will be substantially identical in each security device formed using the process.

It will be appreciated that where the relief structure 22 is to be formed directly in the surface of the substrate web 29, the first printing/coating station 32 can be omitted. Further, in this case, the relief 22 will typically be formed by conventional embossing using heat and pressure in which case embossing roller 33 may be replaced by a conventional embossing nip without any radiation means. However, in some cases the polymeric substance web 29 could itself include a radiation activated curing agent in order to promote hardening and retention of the relief structure once formed. In this case, appropriate radiation means may be retained.

An example of a security device according to a third embodiment of the invention in which the relief 22 is formed directly in the surface of a substrate 29 is depicted in FIG. 9. Here, substrate 29 is itself transparent and constitutes the first transparent layer. The relief structure 22, reflection enhancing layer 23 and second transparent layer 24 are each formed in the same way as described above. The security device could be coated with a transparent adhesive in the same manner as previously described, e.g. if the structure shown in a security article such as a patch, thread or strip which is to be affixed to a security document or other object (substrate 29 acting as a protective cover layer). However, in this example the substrate 29 ultimately forms an integral part of a security document such as a polymer banknote and as such no adhesive layer is required. Instead, the device may be coated with a protective lacquer 26 or this function could be achieved by the second transparent layer 24 itself, with layer 26 being omitted.

As mentioned above, either the first transparent layer 21 or the second transparent layer 24, or both, could contain an optically effective substance. It is most preferred that only the second transparent layer 24 contains an optically variable substance, with the first transparent layer 21 appearing colourless since, as described above, this gives the impression of the optically variable effect being suspended within the device. However, in other cases it may be advantageous to provide the first transparent layer 21 with an optically effective substance and FIG. 10 provides an example according to a fourth embodiment of the present invention in which this is the case. Here, both transparent layers 21 and 24 include different optically variable substances. For example, each transparent layer may include a different visible coloured tint, such as red in layer 21 and yellow in layer 24. In this case, the optically variable effect and the device as a whole will appear red when viewed through the first transparent layer 21. When viewed from the side of the second transparent layer 24, the optically variable effect will appear yellow and its surroundings (which are not optically variable, due to the absence of the reflection enhancing layer in these regions) will appear red. Preferably, the two colours are chosen so as to give a strong contrast between the two areas. It should be noted that where both transparent layers 21 and 24 include one or more optically variable substances, one of the transparent layers 21 or 24 should include at least one optically variable substance which the other transparent layer 21 or 24 does not.

In a variant of the FIG. 10 embodiment, the reflective layer 23 is formed sufficiently thinly so as to appear semi-transparent (e.g. a layer of aluminium having a thickness between 5 and 10 nm). When viewed in reflection, the layer appears primarily reflective (and opaque) whereas when viewed in transmission, the layer can be seen through. This gives rise to an additional colour effect since, when viewed in reflection from each side the appearance will be the same as discussed above in relation to FIG. 10, whilst when viewed in transmission from either side, the colours of layers 21 and 24 will appear superimposed on one another, thereby creating a third colour (e.g. orange). Of course, this third "colour" may only be visible under certain illumination conditions, e.g. UV, depending on the optically variable substances selected.

In still further embodiments, the second transparent layer 24 may be colourless and the first transparent layer 21 may contain the optically effective substance. This would have a similar appearance to that described with respect to FIG. 10, except that the optically variable effect viewed through the second transparent layer would possess the inherent colour of the reflection enhancing layer 23 (e.g. silver).

The security device could include additional layers to those described above, for example, protective lacquer layers could be applied to either side of the device which will typically be colourless although could if preferred include one or more colorants. The security device could additionally comprise one or more printed layers and an example of this is shown in FIG. 11 where printed indicia 27 have been applied following the deposition of the reflection enhancing layer 23. Typically, such printed indicia would be non-transparent meaning that the reflection enhancing layer is obstructed locally, thereby masking the optically variable effect according to the shapes defined by the printed indicia 27. This could be used for example to display text, numbers or other symbols within the device.

The device could also incorporate one or more machine readable substances such as magnetic material. For instance, a transparent magnetic pigment could be incorporated into one or both of the transparent layers, optionally in accordance with a spatial code. This applies to all embodiments.

In the embodiments described so far, the Figures have depicted the relief structure 22 as extending across the whole or majority of the device. However this may not be the case in practice and in particularly preferred embodiments, the relief structure may not be provided across the whole device. Moreover, the lateral extent of the reflection enhancing layer 23 and second transparent layer 24 may go beyond that of the relief structure and an example of this is shown in FIG. 12. This applies to all embodiments. This may be preferred in particular if the relief 23 exhibits a diffractive replay image which appears on a plane in front of or behind that of the device, in which case it may appear to move upon tilting. By continuing the reflective material beyond the edges of the relief (in at least one direction but preferably all), the complete image can still be viewed upon tilting. In addition, the inclusion of a substantially flat reflective region in this way provides a bright, eye-catching feature and hence increases the security level. Preferably the reflection enhancing material 23 and transparent layer 24 extends beyond the edge of the relief structure 22 by at least 100 microns.

FIGS. 13, 14 and 15 depict examples of security documents in which security devices of the sorts described above have been incorporated. FIG. 13 shows a first exemplary security document, here a banknote 40, in (a) plan view and (b) cross-section along line XX'. Here, the banknote 40 is a polymer banknote, comprising an internal transparent polymer substrate 42 which is coated on each side with opacifying layers 43a and 43b in a conventional manner. In some cases, the opacifying layers may be provided on one side of the substrate 42 only. The opacifying layers 43a and 43b are omitted in a region of the document so as to define a window 41, here having a square shape. Within the window region 41 is located a security device 20 in accordance with any of the embodiments discussed above. The outer perimeter of the device 20 is denoted by the dashed circular line surrounding the "sun shaped" optically variable effect region. The security device 20 may be formed integrally in the banknote 40 with the relief structure 22 being formed directly in the surface of transparent substrate 42 in a manner akin to that depicted in FIG. 9. Alternatively, the security device 20 may have been formed separately as a security article such as a transfer patch or label, e.g. having the construction shown in FIG. 5. In this case, the security device 20 may be affixed to the transparent substrate 42 inside the window region 41 by means of the transparent adhesive 25. Application may be achieved by a hot or cold transfer method e.g. hot stamping.

It should be noted that a similar construction could be achieved using a paper/plastic composite banknote in which the opacifying layers 43a and 43b are replaced by paper layers laminated (with or without adhesive) to an internal transparent polymer layer 42. The paper layers may be omitted from the window region from the outset, or the paper could be removed locally after lamination. In other constructions, the order of the layers may be reversed with a (windowed) paper layer on the inside and transparent polymer layers on the outside.

In FIG. 14, the banknote 40 is of conventional construction having a substrate 44 formed for example of paper or other relatively opaque or translucent material. The window region 41 is formed as an aperture through the substrate 44. The security device 20 is applied as a patch overlapping the edges of window 41 utilising transparent adhesive 25 to join the security article to the document substrate 44. Again, the application of the security device and document could be achieved using various methods including hot stamping.

FIG. 15 depicts a third example of a security document, again a banknote 40, to which a security article 50 in the form of a security thread or security strip has been applied. Three security devices 20 each carried on the strip 50 are revealed through windows 41, arranged in a line on the document 40. Two alternative constructions of the document are shown in cross-section in FIGS. 15b and 15c. FIG. 15b depicts the security thread or strip 50 incorporated within the security document 40. For example, the security thread or strip 50 may be incorporated within the substrate's structure during the paper making process using well known techniques. To form the windows 41, the paper may be removed locally after completion of the paper making process, e.g. by abrasion. Alternatively, the paper making process could be designed so as to omit paper in the desired window regions. FIG. 15c shows an alternative arrangement in which the security thread or strip 50 carrying the security device 20 is applied to one side of document substrate 45, e.g. using adhesive. The windows 41 are formed by provision of apertures in the substrate 45, which may exist prior to the application of strip 50 or be formed afterwards, again for example by abrasion.

In each of the examples of FIGS. 13, 14 and 15, the security devices 20 are arranged in a window region 41 of the document 40 which constitutes a transparent portion of the document such that the devices 20 can be viewed from each side of the document at the same location. However, it is not essential that both sides of the same portion of the device be visible to an observer. In other cases, a first side of the device may be revealed at a first location on the document whilst the second side of the device may be revealed at a different location on the document. Examples of this sort will now be described with reference to FIGS. 16 and 17.

FIG. 16 shows an example of a security document 40 formed in a similar manner to that of FIG. 13. Here, the security device 20 has been formed directly on an embossing lacquer 60 coated onto document substrate 42. The device 20 may have a structure similar to that shown in FIG. 9 for example. The opacifying layers 43a and 43b have different extents on each side of the document such that the gaps in each opacifying layer do not overlap (in other cases some overlapping could be provided). This results in two "half-windows" 41a and 41b. In each half-window, only one side of the device is visible. From the front of the document (FIG. 16a), the device 20 can be viewed through half-window 41a, revealing a portion of the optically variable effect in a first colour as determined by the first transparent layer in the manner discussed above. The device is not visible in the same location on the reverse side of the document, as represented by the dashed-line rectangle 41a in FIG. 16b. Conversely, on the reverse side of the note, the device 20 is visible through half-window 41b, and here the optically variable effect of the visible portion will appear with the colour of the second transparent layer, which is different from the first (represented by the shading of the star-shaped region in the Figure). This portion of the device is not visible on the front side of the note.

In this example, the device 20 is one continuous device which extends across both half-window regions. However, in other cases, a plurality of separate security devices, each formed according to the principles described above, could be provided with the same results.

FIG. 17 depicts a further example of a security document 40 having a similar construction to that of FIG. 15, described above. Here, a series of security devices 20 are provided on a security thread or strip 50, which is incorporated into the document during the paper-making process. The document layers 45a and 45b falling on either side of the thread 50 are removed (or alternatively are not formed, during the paper-making process) in regions to create half-windows 41a and 41b as well as a (full) window 41. Example methods of forming half windows on either side of a paper document can be found in EP1567713 and EP229645. As shown in FIG. 17a, from the front side of the document, the security devices will be revealed in the two half-windows 41a as well as the window 41, having a first colour resulting from that of the first transparent layer. From the reverse side (FIG. 17b), devices 20 will be revealed in different locations, namely half-window 41b and window 41 (which has the same location on the front side). From this view point, the devices will appear in a second, different colour as determined by the second transparent layer. In this example, the security devices 20 are provided as a series of separate, identical devices. However, the devices in the series could differ in their content (e.g. holographic image presented), colour (e.g. different second transparent layers) and/or construction. The plurality of devices (or a subset thereof) could also be replaced by a single continuous device as in FIG. 16.

Many alternative techniques for incorporating security documents of the sorts discussed above are known and could be used. For example, the above described device structures could be formed directly on other types of security document including identification cards, driving licenses, bankcards and other laminate structures, in which case the security device may be incorporated directly within the multilayer structure of the document.

The invention claimed is:

1. A security device comprising:
   a first transparent layer having an optically variable effect generating relief structure formed in a surface thereof;
   a reflection enhancing layer extending over the relief structure, both surfaces of the reflection enhancing layer following the contour of the relief structure such that the optically variable effect is exhibited on both sides; and
   a second transparent layer extending over the reflection enhancing layer, a lateral extent of the second transparent layer being less than a whole area of the security device and corresponding to a lateral extent of the reflection enhancing layer,
      wherein the first and/or second transparent layer comprises one or more optically effective substances such that the appearance of the optically variable effect generated by the relief structure is different when viewed through the first transparent layer compared with when viewed through the second transparent layer, at least under illumination at a wavelength at which at least one of the optically effective substance(s) is visible; and
      wherein the lateral extent of the reflection enhancing layer and second transparent layer does not match a lateral extent of the relief structure.

2. A security device according to claim 1, wherein the reflection enhancing layer and second transparent layer extend beyond the periphery of the relief structure in at least one direction by at least 100 microns.

3. A security device according to claim 1, wherein only one of the first and second transparent layers comprises an optically effective substance, the other of the first and second transparent layers appearing colorless under illumination of any wavelength.

4. A security device according to claim 1, wherein each of the first and second transparent layers comprise different optically effective substances.

5. A security device according to claim 1, wherein the first and/or second transparent layers comprise any of:
   one or more optically effective substance(s) which impart a colored tint to the respective layer, which color is visible under illumination at visible wavelengths;
   one or more optically effective substance(s) which are visible only under illumination at selected wavelengths outside the visible spectrum; and
   one or more optically effective substance(s) which undergo a change in appearance in response to changes in one or more of temperature, pressure, strain or electrical potential.

6. A security device according to claim 1, wherein the second transparent layer comprises at least two transparent materials arranged in a pattern, at least one of the transparent materials comprising an optically effective substance such that the appearance of the optically variable effect generated by the relief structure is modified by the pattern when viewed through the second transparent layer, at least under illumination at a wavelength at which the optically effective substance is visible, the at least two transparent materials each comprising a different optically variable substance.

7. A security device according to claim 1, wherein the second transparent layer comprises a resist material which is resistant to etchant suitable for removing material of the reflective layer from the device.

8. A security device according to claim 1, wherein the second transparent layer is a printed layer formed by gravure printing, flexographic printing or slotted die printing.

9. A security device according to claim 1, wherein the lateral extent of the reflection enhancing layer and second transparent layer defines a secure or decorative shape or pattern, or an item of information.

10. A security device according to claim 1, wherein the reflection enhancing layer is semi-transparent.

11. A security device according to claim 1, wherein the reflection enhancing layer comprises a screened working of discontinuous elements.

12. A security device according to claim 1, wherein the reflection enhancing layer comprises any of:
   one or more metals or alloys of copper and/or aluminum;
   an optical interference thin film structure;
   a layer containing metallic particles, optically variable particles or optically variable magnetic particles;
   a photonic crystal layer; or
   a liquid crystal layer.

13. A security device according to claim 1, wherein the optically variable effect generating relief structure comprises a diffractive structure of at least one of a hologram, a diffraction grating or a Kinegram™, or a non-diffractive micro-optical structure.

14. A security device according to claim 1, wherein either the first transparent layer forms an integral part of a substrate, or the first transparent layer is disposed on a substrate.

15. A security article comprising the security device according to claim 1, the security article comprising a transfer band or sheet, a security thread, a foil, a patch, a label or a strip.

16. A security document comprising the security device according to claim 1, the security document comprising a banknote, check, identification document, certificate, share, visa, passport, driver's license, bank card, or ID card.

17. A security device comprising:
a first transparent layer having an optically variable effect generating relief structure formed in a surface thereof;
a reflection enhancing layer extending over the relief structure, both surfaces of the reflection enhancing layer following the contour of the relief structure such that the optically variable effect is exhibited on both sides; and
a second transparent layer extending over the reflection enhancing layer, a lateral extent of the second transparent layer being less than a whole area of the security device and corresponding to a lateral extent of the reflection enhancing layer,
wherein the first and/or second transparent layer comprises one or more optically effective substances such that the appearance of the optically variable effect generated by the relief structure is different when viewed through the first transparent layer compared with when viewed through the second transparent layer, at least under illumination at a wavelength at which at least one of the optically effective substance(s) is visible; and
wherein the second transparent layer comprises at least two transparent materials arranged in a pattern, at least one of the transparent materials comprising an optically effective substance such that the appearance of the optically variable effect generated by the relief structure is modified by the pattern when viewed through the second transparent layer, at least under illumination at a wavelength at which the optically effective substance is visible.

18. A method of manufacturing a security device, comprising:
forming an optically variable effect generating relief structure in a surface of a first transparent layer;
applying a reflection enhancing material over the relief structure to form a reflection enhancing layer, both surfaces of the reflection enhancing layer following the contour of the relief structure such that the optically variable effect is exhibited on both sides;
applying a second transparent layer over the reflection enhancing material; and
removing the reflection enhancing material from regions of the device in which the reflection enhancing material is not covered by the second transparent layer, such that a lateral extent of the reflection enhancing material corresponds to a lateral extent of the second transparent layer;
wherein the first and/or second transparent layer comprises an optically effective substance such that the appearance of the optically variable effect generated by the relief structure is different when viewed through the first transparent layer compared with when viewed through the second transparent layer, at least under illumination at a wavelength at which the optically effective substance is visible;
and wherein the lateral extent of the reflection enhancing material and second transparent layer does not match a lateral extent of the relief structure.

19. A method according to claim 18, wherein the reflection enhancing layer and second transparent layer extend beyond the periphery of the relief structure in at least one direction by at least 100 microns.

20. A method according to claim 18, wherein only one of the first and second transparent layers comprises an optically effective substance, the other of the first and second transparent layers appearing colorless under illumination of any wavelength.

21. A method according to claim 18, wherein each of the first and second transparent layers comprise different optically effective substances.

22. A method according to claim 18, wherein the first and/or second transparent layers comprise any of:
one or more optically effective substance(s) which impart a colored tint to the respective layer, which color is visible under illumination at visible wavelengths; one or more optically effective substance(s) which are visible only under illumination at selected wavelengths outside the visible spectrum; and
one or more optically effective substance(s) which undergo a change in appearance in response to changes in one or more of temperature, pressure, strain or electrical potential.

23. A method according to claim 18, wherein applying the second transparent layer comprises applying at least two transparent materials in a pattern, at least one of the transparent materials comprising an optically effective substance such that the appearance of the optically variable effect generated by the relief structure is modified by the pattern when viewed through the second transparent layer, at least under illumination at a wavelength at which the optically effective substance is visible, wherein the at least two transparent materials each comprise a different optically variable substance.

24. A method according to claim 18, wherein the reflection enhancing layer is semi-transparent.

25. A method according to claim 18, wherein the reflection enhancing layer comprises any of:
one or more metals or alloys of copper and/or aluminum;
an optical interference thin film structure;
a layer containing metallic particles, optically variable particles or optically variable magnetic particles;
a photonic crystal layer; or
a liquid crystal layer.

26. A method according to claim 18, wherein the second transparent layer is applied by printing.

27. A method according to claim 18, wherein the second transparent layer is applied in register with the relief structure.

28. A method according to claim 18, wherein the second transparent layer is applied so as to define a secure or decorative shape or pattern, or an item of information.

29. A method according to claim 18, wherein the second transparent layer is applied so as to define a screened working of discontinuous elements.

30. A method according to claim 18, wherein the reflection enhancing material is removed by etching, the second transparent layer acting as an etch resist.

31. A method according to claim 18, wherein the optically variable effect generating relief structure comprises a diffractive structure of at least one of a hologram, a diffraction grating, a Kinegram™ or a non-diffractive micro-optical structure.

32. A method according to claim 18, wherein either the first transparent layer forms an integral part of a substrate, or the first transparent layer is disposed on a substrate.

33. A security device made in accordance with the method according to claim 18.

34. A method of manufacturing a security device, comprising:

forming an optically variable effect generating relief structure in a surface of a first transparent layer;

applying a reflection enhancing material over the relief structure to form a reflection enhancing layer, both surfaces of the reflection enhancing layer following the contour of the relief structure such that the optically variable effect is exhibited on both sides;

applying a second transparent layer over the reflection enhancing material; and removing the reflection enhancing material from regions of the device in which the reflection enhancing material is not covered by the second transparent layer, such that a lateral extent of the reflection enhancing material corresponds to a lateral extent of the second transparent layer;

wherein the first and/or second transparent layer comprises an optically effective substance such that the appearance of the optically variable effect generated by the relief structure is different when viewed through the first transparent layer compared with when viewed through the second transparent layer, at least under illumination at a wavelength at which the optically effective substance is visible; and wherein applying the second transparent layer comprises applying at least two transparent materials in a pattern, at least one of the transparent materials comprising an optically effective substance such that the appearance of the optically variable effect generated by the relief structure is modified by the pattern when viewed through the second transparent layer, at least under illumination at a wavelength at which the optically effective substance is visible.

35. A security device according to claim 1, wherein the lateral extent of the relief structure extends across the whole area of the security device.

* * * * *